United States Patent
Bourne

(10) Patent No.: US 8,874,363 B2
(45) Date of Patent: Oct. 28, 2014

(54) SITUATION-AWARE PERSONAL INFORMATION MANAGEMENT FOR A MOBILE DEVICE

(75) Inventor: Julian J. Bourne, Weston, MA (US)

(73) Assignee: Proxpro, Inc., Weston, MA (US)

(*) Notice: Subject to any disclaimer, the term of this patent is extended or adjusted under 35 U.S.C. 154(b) by 0 days.

(21) Appl. No.: 13/480,538

(22) Filed: May 25, 2012

(65) Prior Publication Data

US 2014/0039787 A1  Feb. 6, 2014

Related U.S. Application Data

(63) Continuation of application No. 12/202,236, filed on Aug. 30, 2008, now Pat. No. 8,190,359.

(60) Provisional application No. 60/969,359, filed on Aug. 31, 2007.

(51) Int. Cl.
*G01C 21/34* (2006.01)
*G01C 21/20* (2006.01)
*G06Q 10/10* (2012.01)

(52) U.S. Cl.
CPC ............ *G01C 21/3469* (2013.01); *G01C 21/20* (2013.01); *G01C 21/3492* (2013.01); *G06Q 10/109* (2013.01)

USPC ............................ 701/400; 701/410; 701/414

(58) Field of Classification Search
USPC ................... 701/400–412, 414; 345/156, 173
See application file for complete search history.

(56) References Cited

U.S. PATENT DOCUMENTS

| 7,739,040 B2 * | 6/2010 | Horvitz ......................... 701/414 |
| 2005/0021225 A1 * | 1/2005 | Kantarjiev et al. ............ 701/204 |
| 2006/0155465 A1 * | 7/2006 | Jung et al. ..................... 701/209 |

* cited by examiner

*Primary Examiner* — Marthe Marc-Coleman
(74) *Attorney, Agent, or Firm* — David H. Judson

(57) ABSTRACT

A technique for providing a mobile device user with a "when to leave" alarm on his or her mobile device. The user has scheduled an appointment at a given time and location in the user's personal information manager (PIM) executing on the mobile device. A representative PIM is a calendar on the mobile device. The "when to leave" alarm is provided to the end user in the form of a display widget (or "countdown alarm") that automatically activates a given time (e.g., 30 minutes) before a latest departure time for an event in the user's PIM.

4 Claims, 5 Drawing Sheets

SITUATION-AWARE PERSONAL INFORMATION MANAGEMENT FOR A MOBILE DEVICE

This application is a continuation of Ser. No. 12/202,236, filed Aug. 30, 2008, now U.S. Pat. No. 8,190,359, which application was based on and claimed priority from Ser. No. 60/969,359, filed Aug. 31, 2007.

BACKGROUND OF THE INVENTION

1. Technical Field

The present invention relates generally to mobile devices and, in particular, to techniques for providing end users of such devices with real-time situation-aware data.

2. Background of the Related Art

Mobile devices such as the Blackberry® phone have become ubiquitous in today's society. In addition to providing basic wireless telephone service, such devices are Internet-accessible and include highly-efficient processors and display functionality for rendering rich graphical information that is available to be downloaded to the device over the Internet. These devices also include personal information manager (PIM) functions, such as appointment calendars, address books, and the like.

Web sites such as Google Maps provide end users with the capability of obtaining map data defining a navigation route. A recently-added feature to Google Maps enables the end user to view real-time traffic conditions along a desired route.

Vehicle-mounted navigation devices also are well-known in the prior art. These devices interact with global positioning systems (GPS) to provide an end user with up-to-date location information as an end user drives the vehicle along a given route.

BRIEF SUMMARY

The subject disclosure is a technique for providing a mobile device user with a "when to leave" alarm on his or her mobile device so that the user may depart for a desired destination in sufficient time to arrive for a scheduled appointment in a timely manner. In a representative embodiment, a system comprises an end user mobile device that is connectable to a server hosted in or managed by a service provider. The user has scheduled an appointment at a given time and location in the user's personal information manager (PIM) executing on the mobile device. A representative PIM is a calendar on the mobile device (or on a calendar in another device that is then synchronized to the mobile device calendar). According to one aspect of the invention, a "when to leave" alarm is provided to the end user in the form of a display widget (or "countdown alarm") that automatically activates a given time (e.g., 30 minutes) before a latest departure time for an event in the user's PIM.

In one embodiment, the "when to leave" alarm is generated as follows. The mobile device current time and location is compared with the time and location of the end user's next appointment as defined in the PIM (or the like). Using the location data, a fastest route from the current location to the destination location is determined or obtained, preferably taking into consideration traffic conditions. At a given time, a display on the mobile device of the "when to leave" screen is initiated. The "when to leave" screen preferably includes a map of the end user's current location, which changes to a route map, displaying the route ahead a given time period (e.g., 5 minutes) before anticipated departure. The route map preferably shows the fastest route. On the mobile device, a countdown alarm is displayed, preferably in the form of a first color bar concatenated with a second color bar. In a preferred embodiment, the travel time to the destination is shown in red, and a "cushion"—a time between a current time and a latest departure time—is displayed in green. As time elapses, the green portion of the bar shrinks, and the red portion of the bar fluctuates according to real-time and predicted traffic conditions on the route.

Preferably, the countdown alarm is a display widget, which includes a timeline running along a given display axis (e.g. horizontally). As described above, the countdown alarm is, in effect, a timer. A first item on the timeline represents a current time on the mobile device. Next on the timeline is the cushion portion (e.g., shown as a green bar), followed by a travel (or "commute") portion (e.g., shown as a red bar). The length of the cushion (along the timeline) is calculated according to the following algorithm: given an appointment time and the current time, the cushion is equal to [(appointment time−current time)−commute time]. The quantity within the parenthetical is sometimes referred to as the buffer. The commute time is typically provided from a server, which also provides a route map for the commute. After the commute portion, typically a last item on the timeline is the appointment time itself.

The commute portion of the timer typically takes into consideration various types of traffic and travel time. These traffic types include, for example, real-time traffic, historic traffic, and predicted traffic. Real-time traffic typically refers to a check of the traffic along a route at a given time or instant. Historic traffic refers to traffic by time of day and day of week for a given portion of the route. Predicted traffic refers to a blend of real-time and historic traffic, and typically refers to a prediction of how non-recurring traffic will dissipate by the time the traveler arrives at a given segment of the route (e.g., following an accident, which by then might have cleared).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
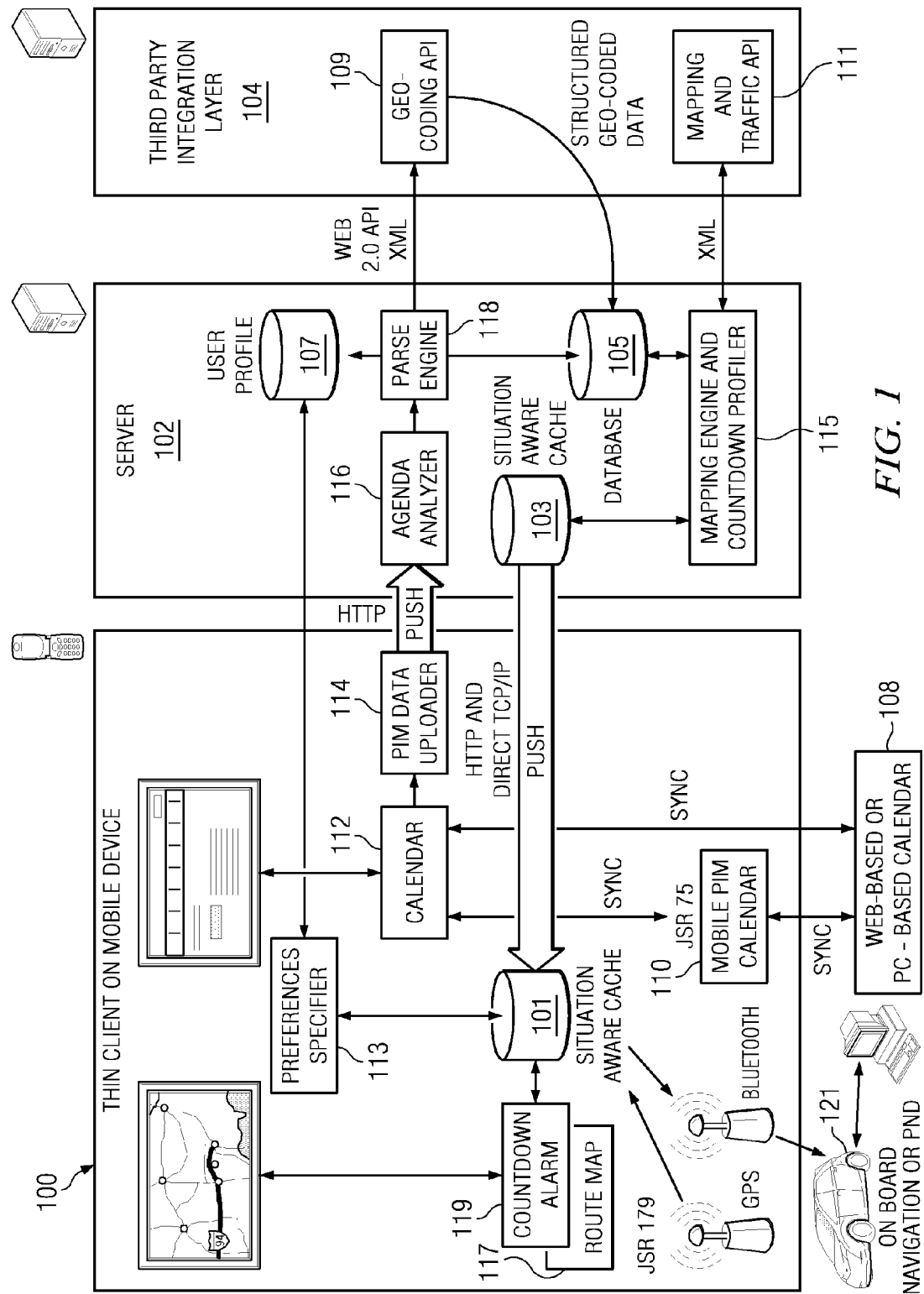
FIG. 1 is a block diagram of the system components in a preferred embodiment of the invention.

The subject disclosure enables mobile device users to perform "situation-aware" personal information management on his or her mobile device. As used herein, a "mobile device user" should be broadly construed. It includes any wireless client device, e.g., a cellphone, pager, a personal digital assistant (PDA, e.g., with GPRS NIC), a mobile computer with a smartphone client, or the like. A typical mobile device is a wireless access protocol (WAP)-enabled device (e.g., an iPhone®, a Blackberry® device, or the like) that is capable of sending and receiving data in a wireless manner using the wireless application protocol. The wireless application protocol ("WAP") allows users to access information via wireless devices, such as mobile phones, pagers, two-way radios, communicators, and the like. WAP supports wireless networks, including CDPD, CDMA, GSM, PDC, PHS, TDMA, FLEX, ReFLEX, iDEN, TETRA, DECT, DataTAC, and Mobitex, and it operates with many handheld device operating systems, such as PalmOS, EPOC, Windows CE, FLEXOS, OS/9, and JavaOS. Typically, WAP-enabled devices use graphical displays and can access the Internet (or other communication network) on so-called mini- or microbrowsers, which are web browsers with small file sizes that can accommodate the reduced memory constraints of handheld devices and the low-bandwidth constraints of a wireless networks. In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats.

Wireless device operating environments in which the subject matter may be implemented also are well-known. In a representative embodiment, a mobile device is connectable (typically via WAP) to a transmission functionality that varies depending on implementation. Thus, for example, where the wireless device operating environment is a wide area wireless network (e.g., a 2.5 G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the subject matter herein may be implemented in other (e.g., 3G) and next-generation mobile networks and devices as well. The mobile device is the physical equipment used by the end user, typically a subscriber to the wireless network. Typically, a mobile device is a 2.5 G- or 3G-compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The mobile device may also include a data store.

With the above as background, the subject matter of the present invention is now described in more detail. According to the subject matter herein, mobile device situation-awareness is facilitated, preferably through a managed service provider. The service provider may be the same entity that provides the end user mobile service, or any other entity. In a representative embodiment, the service provider operates a web site that is Internet-accessible through a web browser on the mobile device (or other machine such as the end user's PC). In a representative embodiment, shown in FIG. 1, a "system" that implements the invention includes a mobile device client 100, a server 102, and a third party integration layer 104. The integration layer 104 may comprise part of the server 102 if the service provider has access to the location and traffic data (as will be described below). The mobile device client preferably is downloaded to and installed in the mobile device in any convenient manner. In one embodiment, the end user opens his or her device browser to the service provider web site and selects a link to download and install the client. Alternatively, the client may be provided as original equipment on the mobile device or otherwise pushed to and installed in the device in any convenient manner. The end user may obtain the client by responding to an SMS or other invitation. The client may be retrieved to another machine (such as the end user's PC) and then transferred to the mobile device over a medium such as a Bluetooth connection.

As shown in FIG. 1, the client, server and integration layers each comprise a number of functional components. This representation is meant to be for convenience of illustration and description, and it should not be taken to limit the scope of the invention as one or more of the functions may be combined. Typically, these components are implemented in software (as a set of processor-executable computer instructions, associated data structures, and the like). One or more of the functions may be combined or otherwise implemented in any convenient manner (e.g., in hardware, in firmware, in combined hardware and software, or the like). As noted above, the mobile device includes a micro-browser or other graphics rendering engine for displaying information to the end user in the usual manner. The device is Internet-accessible and interacts with the server 102 using known Internet protocols such as HTTP, HTTPS, and the like. The server 102 is shown as a single device but this is not a requirement either; one or more programs, processes, or other code may comprise the server and be executed on one or more machines (in one or more networked locations).

The operation of the system is best described by the following example. As seen in FIG. 1, the client 100 and the server 102 include various functional components and associated data stores to facilitate the operation. The operation of the disclosed method may be carried out using system components other than as shown in FIG. 1.

In this example architecture, the client 100 includes a situation-aware cache 101, and the server includes its own situation-aware cache 103. These data stores are used to facilitate the creation and display of a countdown alarm. The server 102 also includes a database (e.g., MySQL) 105 for storing location information, as well as a user profile database 107 for storing user preference data. The integration layer provides one or more application programming interfaces (APIs), such as a geo-coding API 109 for providing the server with information about the destination location, as well as a mapping and traffic API 111 for providing the server with map data and real-time (or historic) traffic data. The geo-coding API provides destination location coordinates, preferably by reverse geo-coding addresses in the end user's PIM. The mobile device actual location is provided using GPS, A-GPS, or other data service, which obtains the device location is a known manner. The map and traffic data is provided (via API 111) from a data service provider or obtained by the application natively. Of course, any convenient data services may be used or otherwise integrated into the situation-aware service offering.

A user of the mobile device enters an appointment event in his or his PC- or web-based calendar 108. Typically, the event data includes fields for date, time, activity, and location. Preferably, the location is a street address. Instead of manual entry, a service provider or other source may be used to obtain a destination location address upon receiving a request for such information. The PC- or web-based calendar 108 at some point is synchronized to a mobile PIM native calendar 110. Of course, the appointment event data may be entered into the PIM native calendar 110 directly. An application calendar module 112 reads the mobile device calendar 110 over a connection, such as an industry standard JSR 75 link. In particular, the calendar module 112 preferably is automatically synchronized to the mobile PIM calendar 110 whenever a new appointment event is added to the calendar 110. Of course, the components 110 and 112 may be integrated together. The appointment event data is assimilated by a PIM data upload function 114, which transfers the data to the server 102, preferably via HTTP. This data is received at the server 102 and processed by an agenda analyzer component 116. The agenda analyzer 116 provides the processed data to a parse engine 118, which is also connected to the third party integration layer 104, preferably via XML. The geo-coding API 109 takes unstructured address information, assesses its quality, adds one or more geo-codes, and structures that data into XML. The structured and geo-code data is stored in the database 105. Meanwhile, a set of user preferences (such as locations of home, work, daily commute times), security data, and current location (typically, the mobile device last known location) data are uploaded to the server, such as by a preferences specification component 113 operating in the client 100. This preference data is stored in the user profile database 107.

As the time of an event approaches, the server code compares the last known location and current time with the location and time of a next appointment. At a given time (typically, 30 minutes before a latest departure time as calculated below), the databases 105 and 107 transfer to a mapping engine and countdown profiler component 115 the following data: current time and location, and event time and location. The mapping engine and countdown profiler component 115 also accesses the third party mapping and traffic APIs, preferably via XML, to obtain the route map and traffic data. The route map data may be obtained at any convenient time once the starting and ending locations are determined, although typically it is desired to obtain the route map with the associated traffic data (which, of course varies based on time of day, day of week, and other non-recurring events, such as traffic accidents, adverse weather, and the like). As described above, a route map may take into consideration various types of traffic and travel time. These traffic types include, for example, real-time traffic, historic traffic, and predicted traffic. Real-time traffic typically refers to a check of the traffic along a route at a given time or instant. Historic traffic refers to traffic by time of day and day of week for a given portion of the route. Predicted traffic refers to a blend of real-time and historic traffic, and typically refers to a prediction of how non-recurring traffic will dissipate by the time the traveler arrives at a given segment of the route (e.g., following an accident, which by then might have cleared). The real-time traffic may be weighted more heavily for the drive closer to the user's departure location, while the predicted traffic may be weighted more heavily for the drive as the user nears the desired destination.

Using the current and event time and location data, and taking into consideration the traffic data, the mapping engine and countdown profiler component 115. This component generates the route map and the commute time. This information is used by the client side of the application to generate and display the countdown alarm to instruct the mobile device user "when to leave" if he or she intends to arrive timely at the desired appointment destination given the time of day, route of travel and traffic conditions along the anticipated route. The situation-aware cache 103 manages the data and pushes the resulting map, commute time and appointment time to the client 100, where it is received by the situation-aware cache 101. The cache 101 on the client side then provisions a route map 117 (with the best or recommended route), as well as the countdown alarm widget 119. As will be seen, this information is then displayed to the end user (preferably in a "just-in-time" manner) to attempt to influence the user's departure (i.e., to provide the desired "situation-awareness").

As also seen in FIG. 1, preferably the data output from the client-side situation-aware cache 101 also is transmitted to the in-vehicle mapping system or other personal navigation device (PND) 121, e.g., using Bluetooth or the like. Alternatively, the server (or other machine or device) may push this information there directly. This enables automated destination retrieval as well as proactive re-routing to avoid traffic in the event the end user makes driving errors or otherwise modifies the route on-the-fly.

Figure 2:
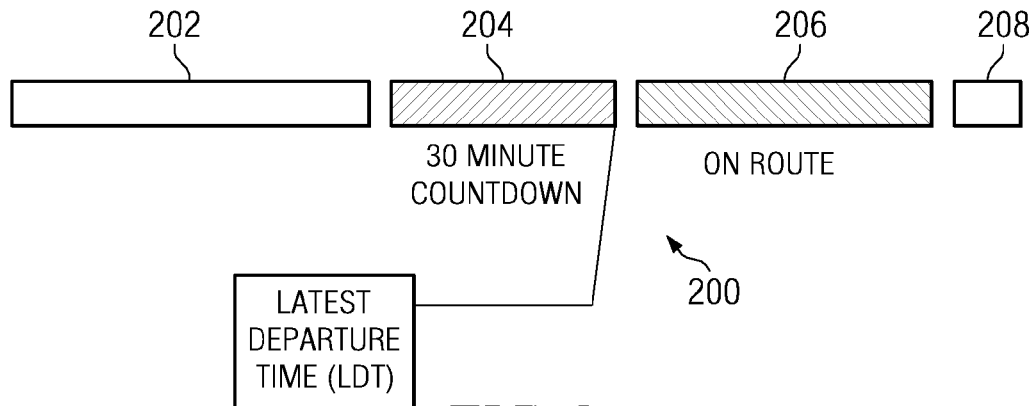
FIG. 2 illustrates a representative countdown widget that is displayed in conjunction with a route map according to the situation-aware functionality described herein.

Thus, according to an embodiment of the invention, the "when to leave" screen (the countdown alarm) automatically activates a given time (e.g., 30 minutes) before a latest departure time for an event in the user's personal information manager (PIM). On the server side, the service compares the mobile device current location with the time and location of the end user's next appointment, works out (or otherwise obtains) a fastest route (preferably allowing for real-time and/or predicted traffic), and then provides information to the client side, which (at a given time) initiates the display (on the mobile device) of the "when to leave" screen. The "when to leave" screen preferably includes a map of the end user's current location, which changes to a route map, displaying the commute ahead a given time period (e.g., 5 minutes) before anticipated departure. The route map preferably shows the fastest route, together with a countdown alarm. The countdown alarm preferably is a graphic element, such as shown in FIG. 2. As seen there, preferably the countdown alarm is a display widget 200 that includes a number of elements. The first element is the current time 202. As described above, if (as a result of the calculation by the mapping engine and countdown profiler component) there is some cushion available (between the user's necessary departure given the anticipated route and traffic (real-time and/or predicted), then this cushion is displayed in the alarm widget, preferably as a green horizontal bar 204. The commute time also is displayed in the widget, preferably as a red horizontal bar 206. The final part of the display widget is the appointment start time 208. The current time 202 and appointment start time 208 may include additional information. Thus, for example, the current time 202 field may itself include a countdown indication, and the appointment start time field may be annotated to include other data, such as event attendees, reminders, and the like.

Thus, as seen in FIG. 2, the countdown alarm preferably is a display widget, which includes a timeline running along a given display axis (e.g. horizontally). As described above, the countdown alarm is, in effect, a timer. A first item on the timeline represents a current time on the mobile device. Next on the timeline is the cushion portion (e.g., shown as a green bar), followed by a travel (or "commute") portion (e.g., shown as a red bar). The length of the cushion (along the timeline) is calculated according to the following algorithm: given an appointment time and the current time, the cushion is equal to [(appointment time−current time)−commute time]. The quantity within the parenthetical is sometimes referred to as the buffer. The commute time is typically provided from a server, which also provides a route map for the commute. After the commute portion, typically a last item on the timeline is the appointment time itself.

Figure 3:
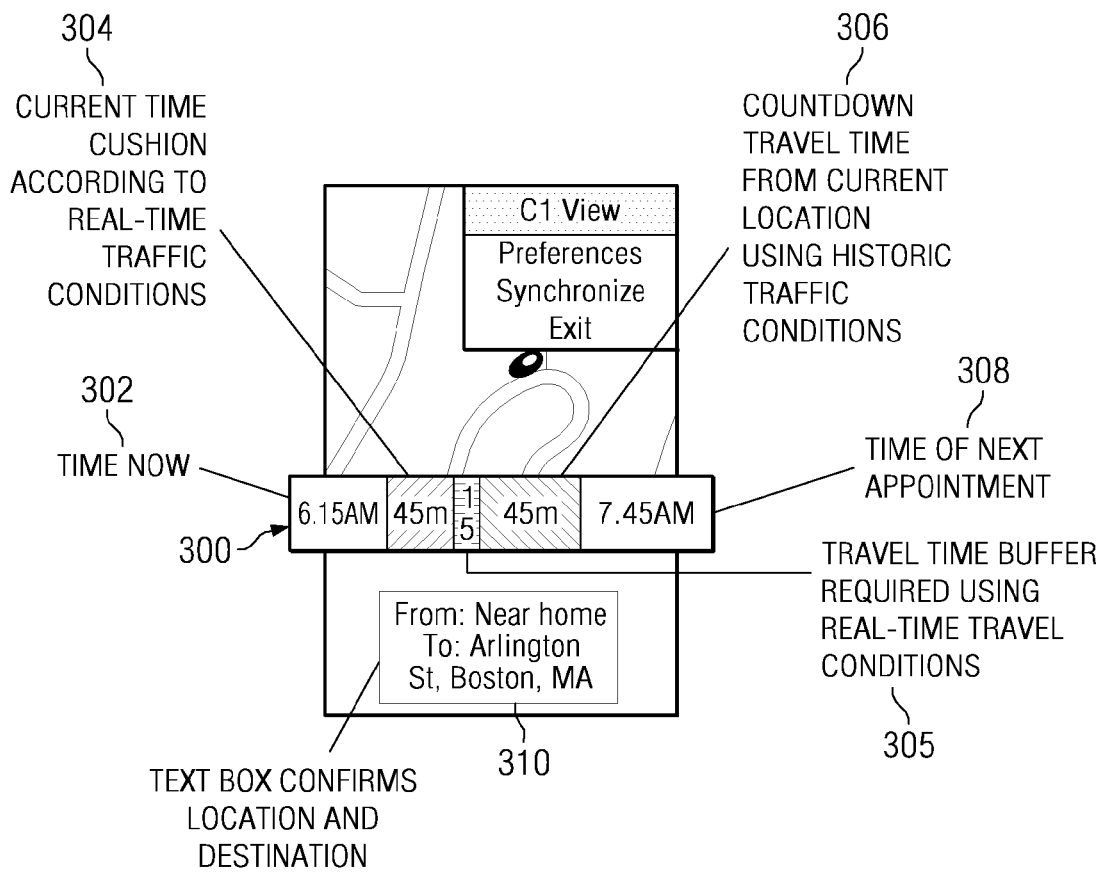
FIG. 3 illustrates an alternative embodiment of the countdown widget that is displayed in conjunction with a route map according to the situation-aware functionality.

FIG. 3 illustrates an alternative embodiment of the countdown alarm. In this embodiment, the countdown alarm 300 comprises an additional element. Once again, the first element is the current time 302. The green bar 304 represents the current time cushion according to real-time traffic conditions, and the red bar 306 illustrates the countdown travel time from the current location to the destination using historic traffic conditions. The appointment start time 308 is also provided. In addition, in this embodiment the countdown alarm 300 also includes an orange bar 305, which represents a traffic surplus (that represents an incremental traffic delay over historic traffic for the intended route) that may be exist given the real-time traffic conditions. This surplus is included in the red bar portion of the countdown alarm in FIG. 2. In this embodiment, the countdown alarm also displays the departure and destination locations in a text box 310.

The following describes one technique for overlaying the countdown alarm on the route map. In general, the route map is provisioned according to predetermined dimensions (corresponding to the display area of the mobile device) leaving a space for the countdown alarm. The program then calculates the dimensions of the countdown alarm and fits it into the space. In particular, preferably the route map is returned from the server to the mobile device in the form of a byte stream of a .png image. Then, at the mobile device, this byte stream is converted back into a .bmp file. The .bmp file is fitted into a bitmap field in the display. The countdown alarm is calculated in a countdown timer display widget. In one embodiment, the countdown timer display widget comprises a number of elements. As noted above, the first element is the current time. If there is some cushion available, then this cushion is displayed in the alarm widget, preferably as a green horizontal bar. The commute time is then displayed in the widget, preferably as a red horizontal bar. The final part of the display widget is the appointment start time.

Figure 4:
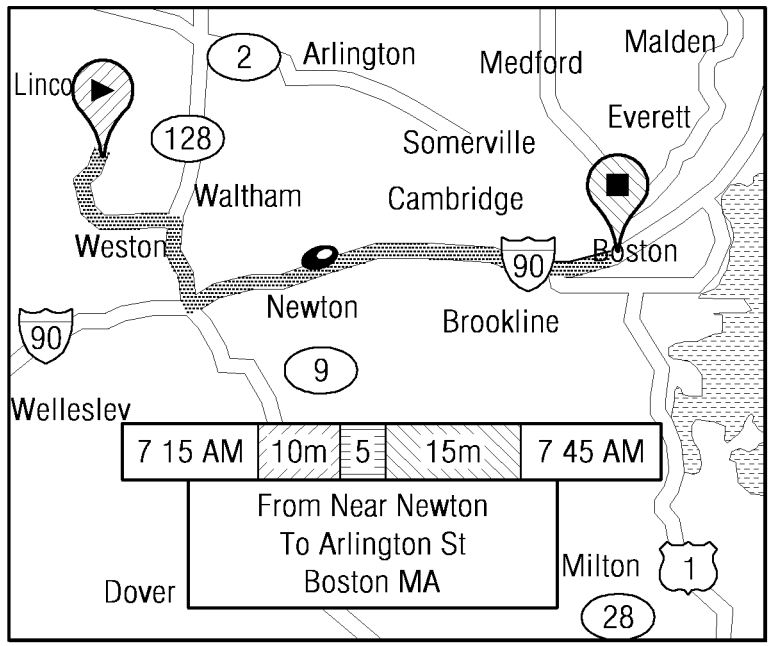
FIG. 4 illustrates the widget of FIG. 3 during the end user's travel along the route.
Figure 5:
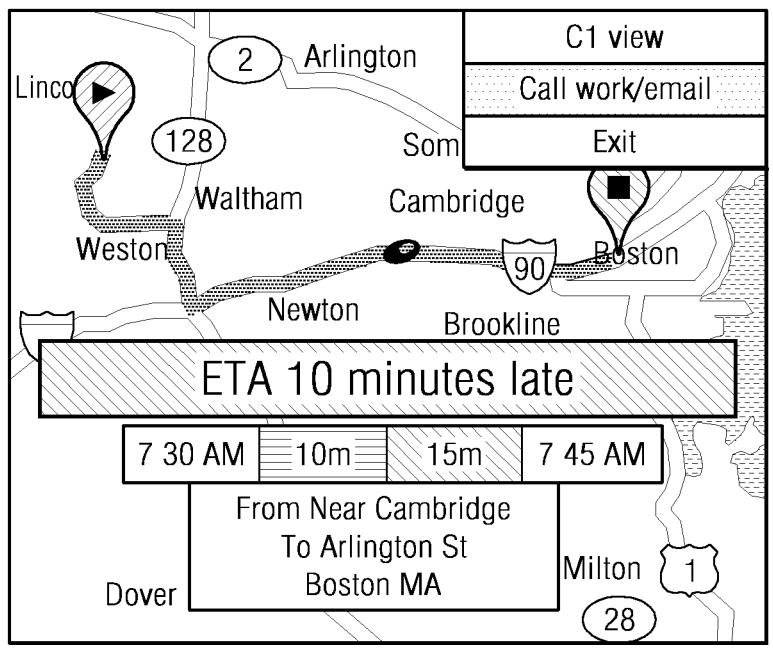
FIG. 5 illustrates the widget modified to display an alert to the end user.

Thus, according to the described subject matter, the situation-aware application takes given data (current location A and location of an appointment B, current time and desired destination arrival time), calculates the fastest route from A to B, checks historical travel times from A to B to arrive at the appointment time, indexes real-time traffic conditions to calculate the traffic buffer (optional), and then creates the countdown alarm. The alarm is then overlaid or displayed within the route map (or some portion thereof), such as already shown in FIG. 3. While on route, as shown in FIG. 4, the application may zoom out to show both locations A and B. Preferably, while on route the countdown alarm dynamically changes to show the time cushion, traffic delay and historic travel duration. If the user is running late (e.g., due to a traffic incident), the display may be modified, such as shown in FIG. 5. In particular, and as shown in FIG. 5, when the historical time and traffic delay is greater than a current time until the planned arrival time, preferably the application alerts the user that he or she is going to be late; at this time, a menu item may also be provided to enable the user to make a call (to the destination) or send an email (or SMS) to notify another of the anticipated delay in the arrival.

Figure 6:
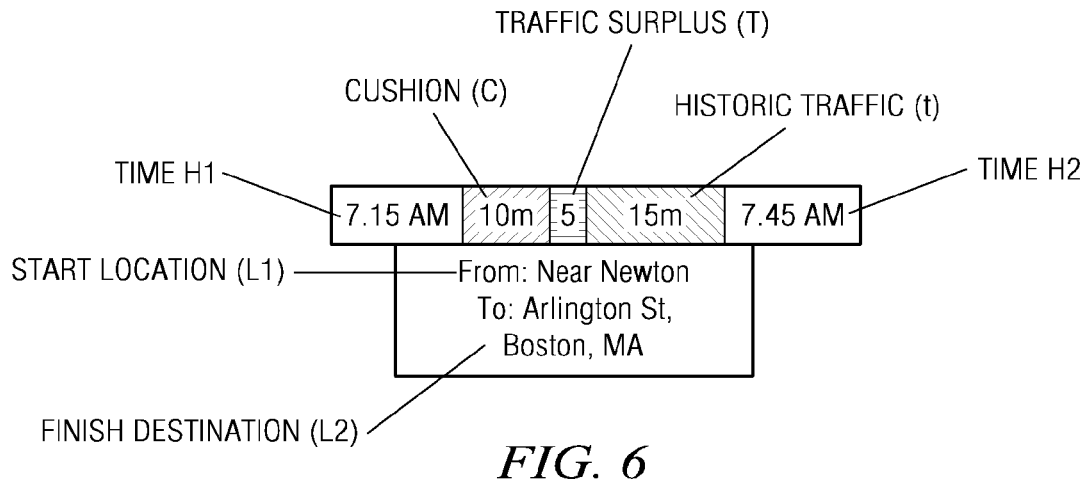
FIG. 6 illustrates the display widget and associated temporal variables.

The following describes a representative algorithm for generating the countdown timer, such as shown in FIG. 6. This algorithm is executed in software (as a set of processor-enabled program instructions) by the server-side countdown profiler component:

Time (H1): Current time

Time (H2): Scheduled time due at destination location

Start location (L1): GPS coordinates from the mobile phone (or network)

Destination location (L2): Location of agenda item (event appointment)

Historic traffic (t): The historic time to travel, by car, transit or as a pedestrian, from start location to finish location. Historic time typically corresponds to same time of day and day of week, using predetermined turn-by-turn directions or pedestrian or transit navigation directions.

Historic traffic=t t=historic travel time from L1 to L2

Traffic surplus/deficit (T) At predetermined intervals real-time traffic conditions are assessed for the intended route. If the real-time traffic conditions require that the predicted travel time increases, then this is said to be a traffic surplus. The traffic surplus is the incremental traffic delay over historic traffic for the intended route. In effect, this value represents the increased time to get to the destination under current traffic conditions. If, for some reason, the traffic surplus is in fact a deficit (because traffic is unusually light on the intended route), then a deficit shows and the time cushion increases accordingly.

Traffic surplus=T

T=(Real-time travel duration from L1 to L2)−t

T can be negative if there is unusually light traffic.

The cushion (C) The time cushion is a time interval between the current time and the departure time. The departure time equals the time when the user should leave the start location, taking account of historic traffic conditions plus the traffic surplus interval to arrive at the finish destination on time.

The cushion=C

C=(((H2−H1)−T)−t)

Preferably, the server uses a last valid location as an assumed start location. If the start location is incorrect, the end user can open a menu and select a "locate me" option, choose an alternative start location from a list, or enter a new start location.

While on route to the destination, as noted above, the user can check the display as desired to determine if he or she will arrive on time. In particular, as the mobile device begins following the desired route, the server recognizes this and periodically (e.g., once per minute) checks the route ahead for traffic. The server updates the user's position, and the green portion of the bar (the cushion) fluctuates according to the number of minutes the end user is then predicted to arrive early for the meeting. The end user may keep this display running right up until his or her arrival at the desired destination.

As noted above, preferably the situation-aware application uses the personal information manager (PIM) of the mobile device. The PIM is a software application that functions as a personal organizer. As an information management tool, a PIM's purpose is to facilitate the recording, tracking and management of certain types of personal information. If the device does not include a PIM, other tools (such as a calendar, mail client, or the like) may be used to interface the appointment data to the situation-aware functionality as previously described. The mobile client, working from the PIM agenda and location, displays the countdown timer in the manner previously described to provide situation-awareness.

The situation-aware application brings together data (e.g., from the PIM calendar and address book) to enable the end user to have an appointment location displayed on a map that also includes the mobile device's current location (obtained, for example, from a GPS or A-GPS data service). APIs to the service provide destination location coordinates, preferably by reverse geo-coding addresses in the PIM, or by any other convenient technique. Turn-by-turn directions, pedestrian routes or transit route APIs calculate (or provide) the fastest route from the current location to the destination (finish) location. Traffic APIs calculate (or provide) the historic traffic (or normal time on public transport) for the route and the real-time traffic delays for the route. Using this data, the application calculates a time cushion between a current time and the time the user must leave for the appointment to arrive on-time. Preferences can also be set to provide one or more alerts in the event traffic delays or other unanticipated events occur along the intended route. With the countdown alarm, the end user can tell at a glance whether he or she is going to be on-time for the appointment. In this manner, the application determines and displays in a unique manner a latest departure time to ensure that the end user can arrive at the desired destination given the anticipated and real-time traffic. As a consequence, the application enables the end user to arrive on-time, to know a latest departure time (for optimal productivity), to have peace-of-mind during the travel that he or she will arrive in sufficient time for the appointment, and to easily carry out messaging if unforeseen circumstances occur that will delay arrival.

Variants

The countdown alarm may be a display widget that is displayed in other than a horizontal timeline. Thus, for example, in an alternative embodiment, the alarm may be displayed vertically. In another alternative, the cushion and commute times may be displayed one above the other, one inside the other (as in a set of circles), or in some other juxtaposed relation. Regardless of display format or orientation, the cushion element and the corresponding commute element will change dynamically in the manner described as the timer runs forward and approaches the latest departure time.

One of ordinary skill in the art will appreciate that the green-red (FIG. 2) or green-orange-red (FIG. 3) coloration is not limiting, as any other convenient colorations (or greyscales) may be used.

While the above-described and illustrated countdown alarms are preferred, other approaches may be used to render or augment the countdown timer. In one alternative embodiment, the countdown timer comprises one or more audible signals associated with the display graphics. Thus, considering the FIG. 2 embodiment, the mobile device may also be controlled by the software to issue an audible warning at the start of the cushion (the left-most portion of the green bar), as well as an audible "time to leave" warning at what is the beginning of the red portion. Additional reminders may be output aurally as needed or desired to ensure that the end user departs in a timely manner. Where the display is not working or it otherwise disabled, it may be desired just to issue the audible warnings.

The route map may omit the traffic conditions (or perhaps one type of traffic data), although this is a less preferred approach.

It may also be desirable to provide ancillary information to the countdown alarm. One type of information might be fuel consumption data during the actual or upcoming travel. In this embodiment, fuel consumption data may be overlaid or otherwise displayed in juxtaposition to the route map (including predicted traffic) with the constraint that the optimal departure time be selected to minimize travel duration and fuel consumption.

A further variant enables the display of location of places routinely visited (e.g., for instance home and work locations) and the times (and/or days of the week) when the user wishes to arrive. Thus, "when to leave" alerts can be received for frequent trips without the necessity of updating the PIM calendar.

Figure 7:
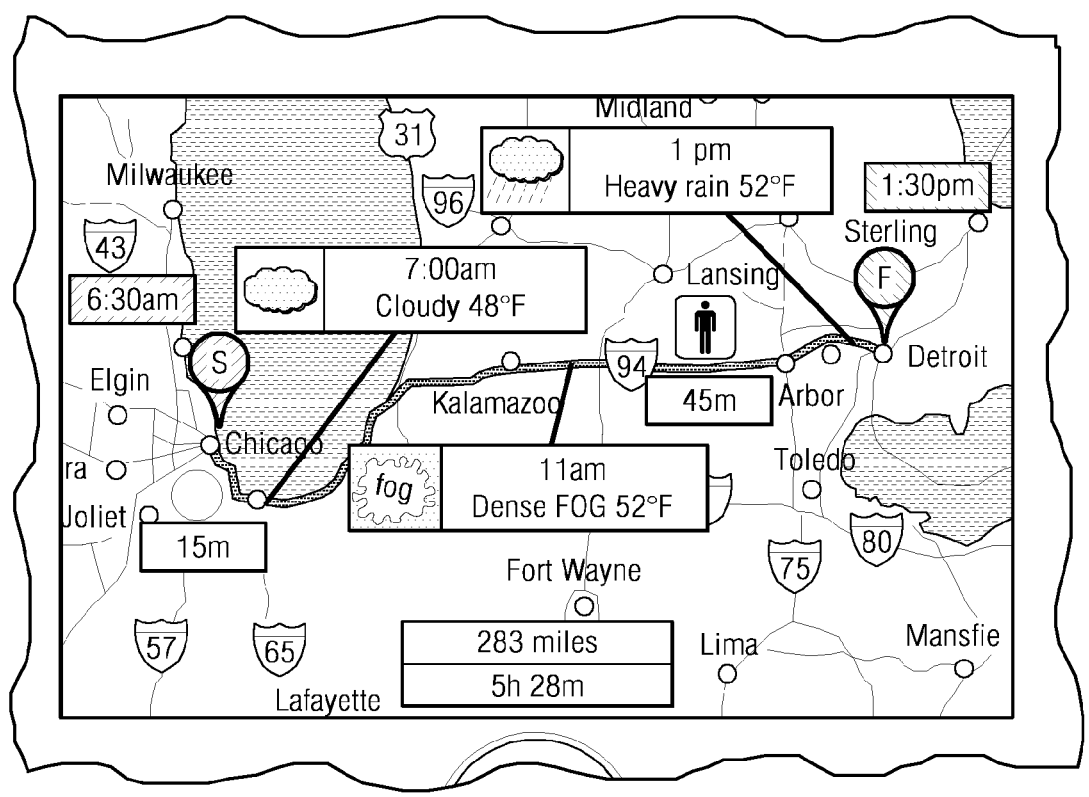
FIG. 7 illustrates a route map with a weather data overlay that is time- and location-specific.

Another variant adds time and location-based weather reports along the planned route. Generally, weather reports fix the location of an individual and then provide hourly weather forecasts (or other forecasts, such as daily forecasts) for the specific location. A more convenient and accurate representation of weather, however, predicts where an individual will be (e.g., from PIM calendar data) and their progress along a route and presents the weather forecast that is customized according to a future time and position. This is illustrated in FIG. 7.

Figure 8:
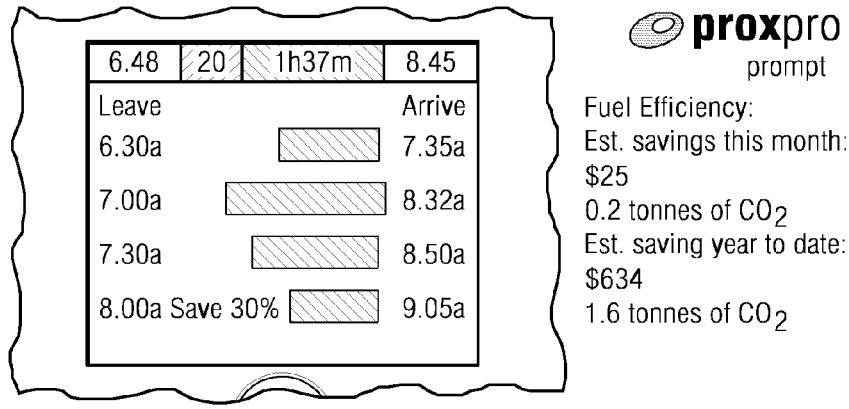
FIG. 8 illustrates mobile device displays showing alternative departure and arrival time options adjacent to times, as well as associated fuel consumption.

Due to fluctuations in traffic conditions on a route (e.g., during rush hour to a major city), altering the departure time can impact the travel time and fuel consumption for the journey (more traffic time corresponds to more idling of the vehicle consuming fuel without moving, or consuming fuel sub-optimally by moving slowly). Based on the user's configurable priorities (e.g., to arrive punctually or to minimize travel time or fuel consumption), another variant of the application presents alternative departure and arrival time options adjacent to times specified in the PIM calendar. This display is generated by consulting real-time, historic and predicted traffic for the best route. For each departure time option, the speed of traffic for each segment of each route is predicted. By correlating the duration and speed of travel, along each segment, for each option, with the fuel consumption profile of the vehicle, the predicted fuel consumed can be calculated, together with the carbon footprint and conveniently presented to the driver so that they can make an informed choice according to their afore mentioned priorities. FIG. 8 illustrates the representative displays.

Another variant matches the timing, start locations and finish locations of drivers from their PIM entries, and matches users who have similar plans enabling users to carpool and reduce traveling costs, as well as reduce congestion. This variant may be implemented as a managed or hosted service using a web site that is accessed by end users in the usual manner.

Another variant of the application allows users to select PIM entries for future events and to predict the travel time at the specific time and day of travel.

Another variant may interpret the "when to leave" screen as confirmation that the driver is on schedule, or late, for the PIM calendar event. If there is a change in traffic conditions, either before departure or while on route, the application can interact with turn-by-turn directions to allow the user to navigate around congestion.

Figure 9:
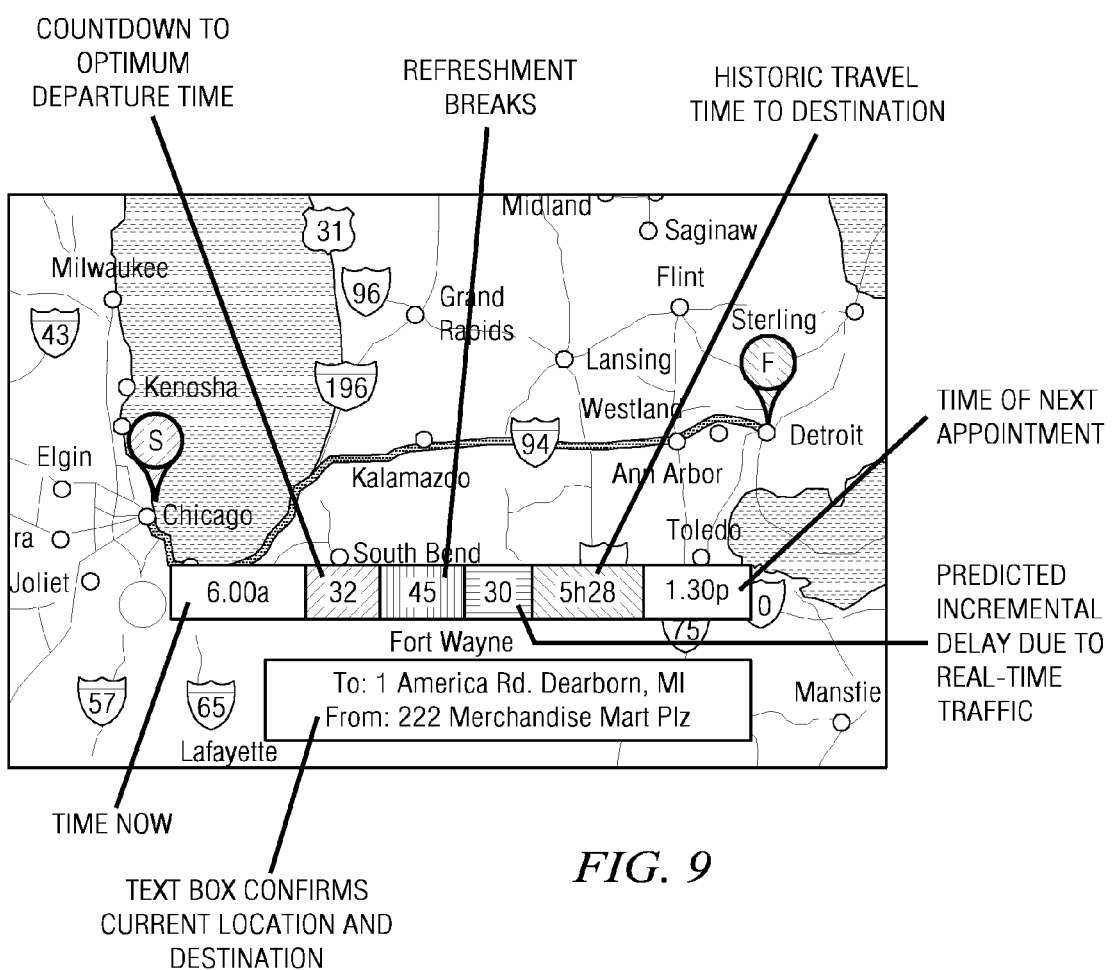
FIG. 9 illustrates a display showing the countdown alarm that includes a portion representing a break time.

Another variant enables users to specify their preferred refreshments, e.g., branded coffee, their preferred time to consume and the duration of a travel break. This information can be used to geo-locate convenient vendors on the route, corresponding to the users progress, and a break time can be added to the countdown alarm (sometimes in a new color), adjusting the optimum time of departure accordingly. This is illustrated in FIG. 9.

As noted above, preferably the client 100 communicates to the server over an interface. There may also be an interface between the server and one or more third party daa services. One or more of these interfaces may be conveniently enabled using AJAX (Asynchronous Javascript and XML), which are a known set of web development techniques that enhance the web page's interactivity, speed and usability. AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the subject matter herein has been described in the context of a method or process, the disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A representative mobile device is a Blackberry Curve 8800 mobile device running the client-side situation-aware application functionality as a J2ME application. A given implementation of the server 102 component is a Linux-based server running Apache, mySQL, and where the server-side situation-aware application functionality is implemented in Python code, and/or one or more Perl scripts.

More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

While given components of the system have been described separately, one of ordinary skill will appreciate that some of the functions may be combined or shared in given instructions, program sequences, code portions, and the like.

The invention claimed is:

1. An article comprising a non-transitory machine-readable medium that stores a program, the program being executed by a computing device to perform a method to provide situation-awareness to a user of the computing device, the computing device having a display associated therewith, the method comprising:
   for a given vehicle route having a starting location and an ending location, generating at least two departure options;
   predicting a carbon footprint value associated with travel along the given vehicle route at each of the two departure options; and
   displaying information associated with the predicted carbon footprint values to enable a user to make an informed decision with respect to the departure options.

2. The article as described in claim 1 wherein the step of generating the departure options is based in part on a given user-configurable priority.

3. An article comprising a non-transitory machine-readable medium that stores a program, the program being executable by a server machine to perform a method to provide situation-awareness to a user of a mobile device, the method comprising:
   receiving first information identifying a first time, and a starting location;
   receiving second information identifying a second time, and an ending location;
   receiving third information indicative of a recommended vehicle route from the starting location to the ending location, the third information also including data associated with traffic conditions along the recommended vehicle route; and
   based on the first, second and third information, generating fourth information for delivery to a mobile device to indicate a latest departure time from the starting location to ensure that the user of the mobile device can arrive at the ending location at the second time via the recommended vehicle route;
   the latest departure time being a time in the future;
   predicting a carbon footprint value associated with travel along the recommended vehicle route at each of at least first and second departure times; and
   providing fourth information to facilitate display of information associated with the predicted carbon footprint value.

4. An article comprising a non-transitory machine-readable medium that stores a program, the program being executable by a server machine to perform a method to provide situation-awareness to a user of a mobile device, the method comprising:
   receiving first information identifying a first time, and a starting location;
   receiving second information identifying a second time, and an ending location;
   receiving third information indicative of a recommended vehicle route from the starting location to the ending location, the third information also including data associated with predicted traffic conditions along the recommended vehicle route, the predicted traffic conditions based on a blend of real-time and historic traffic and including a prediction of how non-recurring traffic is expected to dissipate by a given time along the recommended vehicle route; and based on the first, second and third information, generating fourth information for delivery to a mobile device to indicate a latest departure time from the starting location to ensure that the user of the mobile device can arrive at the ending location at the second time via the recommended vehicle route;

the latest departure time being a time in the future.

* * * * *